(12) United States Patent
Harary et al.

(10) Patent No.: US 9,911,033 B1
(45) Date of Patent: Mar. 6, 2018

(54) SEMI-SUPERVISED PRICE TAG DETECTION

(71) Applicant: International Business Machines Corporation, Armonk, NY (US)

(72) Inventors: Sivan Harary, Manof (IL); Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/256,648

(22) Filed: Sep. 5, 2016

(51) Int. Cl.
| | |
|---|---|
| *G06K 9/00* | (2006.01) |
| *G06K 9/66* | (2006.01) |
| *G06K 9/62* | (2006.01) |
| *G06K 9/52* | (2006.01) |
| *G06T 7/60* | (2017.01) |
| *G06T 7/00* | (2017.01) |
| *G06K 9/46* | (2006.01) |

(52) U.S. Cl.
CPC ....... *G06K 9/00442* (2013.01); *G06K 9/4604* (2013.01); *G06K 9/52* (2013.01); *G06K 9/6267* (2013.01); *G06K 9/66* (2013.01); *G06T 7/0004* (2013.01); *G06T 7/0085* (2013.01); *G06T 7/60* (2013.01); *G06T 2207/30108* (2013.01)

(58) Field of Classification Search
CPC combination set(s) only.
See application file for complete search history.

(56) References Cited

U.S. PATENT DOCUMENTS

| | | | |
|---|---|---|---|
| 7,933,804 | B2 | 4/2011 | Bhyravabhotla |
| 2008/0177684 | A1* | 7/2008 | Laxman ............... G06K 9/6256 706/20 |

(Continued)

FOREIGN PATENT DOCUMENTS

| | | |
|---|---|---|
| EP | 3032459 | 6/2016 |
| WO | 2008039157 | 4/2008 |

(Continued)

OTHER PUBLICATIONS

Mattias Marder., "Using image analytics to monitor retail store shelves", IBM Journal of Research and Development (vol. 59, Issue: 2/3), pp. 3:1-3:11, Date of publication: Mar.-May 2015.

*Primary Examiner* — Alex Liew

(57) ABSTRACT

A method comprising: training a price tag detector, comprising a gross feature detector and a classifier, to automatically detect a price tag in an image, by: a) training the gross feature detector using supervised learning with labeled images, and b) training the classifier using a two-phase hybrid learning process comprising: c) applying an initial supervised learning using the labeled images, yielding a semi-trained version of the classifier, and d) applying a subsequent unsupervised learning using unlabeled images, yielding a fully trained version of the classifier, wherein applying the unsupervised learning comprises: for each unlabeled image: i) detecting multiple price tag hypotheses using the gross feature detector, ii) classifying each price tag hypothesis using the semi-trained classifier, ii) rating each classification based contextual data extracted from the unlabeled image, iv) retraining the semi-trained classifier with the rated classifications, and repeating steps ii) through iv) until the reclassification converges.

20 Claims, 11 Drawing Sheets

(56) References Cited

U.S. PATENT DOCUMENTS

| | | | |
|---|---|---|---|
| 2011/0026840 A1* | 2/2011 | Tao | G06K 9/00684 |
| | | | 382/224 |
| 2011/0052063 A1* | 3/2011 | McAuley | G06K 9/527 |
| | | | 382/180 |
| 2012/0087547 A1* | 4/2012 | He | G06K 9/629 |
| | | | 382/110 |
| 2015/0363758 A1 | 12/2015 | Wu et al. | |
| 2016/0260051 A1* | 9/2016 | Wu | G06Q 10/087 |

FOREIGN PATENT DOCUMENTS

| | | |
|---|---|---|
| WO | 2009027836 | 3/2009 |
| WO | 2014181323 | 11/2014 |

\* cited by examiner

SEMI-SUPERVISED PRICE TAG DETECTION

BACKGROUND

This invention relates to the field of computer vision.

Machine learning techniques are used in a variety of tasks relevant to computer vision applications. A machine learned system can analyze a visual scene captured in a digital image and cluster data to find patterns, as well as detect and classify visual features. In the latter application, portions of an image, or features, are typically extracted, analyzed, and classified in an iterative process that 'teaches' the machine to classify of features extracted from newly provided images based on predictive analysis, thereby allowing the computer to 'see' these features and identify them.

Machine learning techniques fall into several general categories, including both supervised and unsupervised learning. Supervised learning is based on labeled inputs that provide the computer with the desired output value during the learning process; whereas unsupervised learning is based on unlabeled inputs and allow the computer to independently find structure in the input data.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: training a price tag detector that comprises a gross feature detector and a classifier, to automatically detect a price tag in an image, by: a) training the gross feature detector using a supervised learning process with a set of labeled images, and b) training the classifier using a two-phase hybrid learning process comprising: applying an initial supervised learning phase using the set of labeled images, yielding a semi-trained version of the classifier, and applying a subsequent unsupervised learning phase using a set of unlabeled images, yielding a fully trained version of the classifier, wherein the applying of the unsupervised learning phase comprises, for each unlabeled image: i) detecting multiple price tag hypotheses using the gross feature detector, ii) classifying each price tag hypothesis using the semi-trained classifier, iii) rating each classification based contextual data extracted from the unlabeled image, iv) retraining the semi-trained classifier with the rated classifications, and repeating steps ii) through iv) until the reclassification converges thereby yielding the trained classifier.

In some embodiments, the classifier is a support vector machine (SVM), wherein the price tag hypotheses comprise any of a price tag detection and a false positive detection, and wherein each price tag hypothesis is formulated as a Fisher vector by: transforming each price tag hypothesis to a canonical size, calculating one or more local descriptors for each price tag hypothesis using a dense scale-invariant feature transform (SIFT), concatenating the one or more local descriptors to form a single concatenated vector, training a Gaussian mixture model (GMM) for each local descriptor, and using the GMMs to calculate a Fisher representation for the concatenated vector, wherein classifying each price tag hypothesis using the semi-trained classifier comprises classifying the Fisher vectors using the SVM.

In some embodiments, the method further comprises using the at least one hardware processor for extracting the contextual data by using an algorithm selected from the group consisting of: an optical character recognition (OCR) algorithm, a product recognition algorithm, an edge detection algorithm, a depth detection algorithm, and a contour detection algorithm.

In some embodiments, the method further comprises capturing an image, and using the at least one hardware processor for detecting a price tag in the captured image using the price tag detector.

There is provided, in accordance with an embodiment, a computer program product comprising a non-transitory computer-readable storage medium having program code embodied thereon, the program code executable by at least one hardware processor to: train a price tag detector that comprises a gross feature detector and a classifier, to automatically detect a price tag in an image, by: a) training the gross feature detector using a supervised learning process with a set of labeled images, and b) training the classifier using a two-phase hybrid learning process comprising: applying an initial supervised learning phase using the set of labeled images, and yielding a semi-trained version of the classifier, and applying a subsequent unsupervised learning phase using a set of unlabeled images, yielding a fully trained version of the classifier, wherein applying the unsupervised learning phase comprises: for each unlabeled image: i) detecting multiple price tag hypotheses using the gross feature detector, ii) classifying each price tag hypothesis using the semi-trained classifier, iii) rating each classification based contextual data extracted from the unlabeled image, iv) retraining the semi-trained classifier with the rated classifications, and repeating steps ii) through iv) until the reclassification converges thereby yielding the trained classifier.

In some embodiments, the price tag hypotheses comprise any of a price tag detection and a false positive detection, and the program code is further executable to: represent each price tag hypothesis as a Fisher vector by: transforming each price tag hypothesis to a canonical size, calculating one or more local descriptors for each price tag hypothesis using a dense scale-invariant feature transform (SIFT), concatenating the one or more local descriptors to form a single concatenated vector, training a Gaussian mixture model (GMM) for each local descriptor, and using the GMMs to calculate a Fisher representation for the concatenated vector, wherein classifying each price tag hypothesis using the semi-trained classifier comprises classifying the Fisher vectors using the SVM.

In some embodiments, the gross feature detector comprises a Viola Jones Cascade algorithm, and wherein the labeled images comprise multiple categories of aspect ratios and price tag formats, wherein the gross feature detector comprises an aggregation of multiple feature detection algorithms, each trained on a different one of the categories.

In some embodiments, the contextual data is selected from the group consisting of: a color attribute, a texture attribute, a depth attribute, a flatness attribute, a relative position of any of the detected features, a detected edge, a detected product, a detected alphanumeric character, a color of the alphanumeric character, a size of the alphanumeric character, a font of the alphanumeric character, and a background color.

In some embodiments, the contextual data is extracted by using an algorithm selected from the group consisting of: an optical character recognition (OCR) algorithm, a product recognition algorithm, an edge detection algorithm, a depth detection algorithm, and a contour detection algorithm.

There is provided, in accordance with an embodiment, a system, comprising: at least one hardware processor; and a non-transitory memory device having embodied thereon program code executable by said at least one hardware processor to: train a price tag detector that comprises a gross feature detector and a classifier, to automatically detect a price tag in an image, by: a) training the gross feature detector using a supervised learning process with a set of labeled images, and b) training the classifier using a two-phase hybrid learning process comprising: applying an initial supervised learning phase using the set of labeled images, and yielding a semi-trained version of the classifier, and applying a subsequent unsupervised learning phase using a set of unlabeled images, yielding a fully trained version of the classifier, wherein applying the unsupervised learning phase comprises: for each unlabeled image: i) detecting multiple price tag hypotheses using the gross feature detector, ii) classifying each price tag hypothesis using the semi-trained classifier, iii) rating each classification based contextual data extracted from the unlabeled image, iv) retraining the semi-trained classifier with the rated classifications, and repeating steps ii) through iv) until the reclassification converges thereby yielding the trained classifier.

In some embodiments, the system further comprises a storage device configured to store the labeled images and the unlabeled images.

In some embodiments, the system further comprises a camera configured to capture any of the labeled and unlabeled images.

In some embodiments, the system further comprises a network, wherein the camera is integrated with a computing device configured to transmit any of the labeled and unlabeled images to the at least one hardware processor via the network.

In some embodiments, the feature detection algorithm is a Viola Jones Cascade algorithm.

In some embodiments, the set of labeled images comprise multiple categories of aspect ratios and price tag formats, wherein the feature detection algorithm comprises an aggregation of multiple feature detection algorithms, each trained on a different one of the categories.

In some embodiments, the price tag hypotheses comprise any of a price tag detection and a false positive detection, and the program code is further executable by said at least one hardware processor to: represent each price tag hypothesis as a Fisher vector by: transforming each price tag hypothesis to a canonical size, calculating one or more local descriptors for each price tag hypothesis using a dense scale-invariant feature transform (SIFT), concatenating the one or more local descriptors to form a single concatenated vector, training a Gaussian mixture model (GMM) for each local descriptor, and using the GMMs to calculate a Fisher representation for the concatenated vector, wherein classifying each price tag hypothesis using the semi-trained classifier comprises classifying the Fisher vectors using the SVM.

In some embodiments, the contextual data is selected from the group consisting of: a color attribute, a texture attribute, a depth attribute, a flatness attribute, a relative position of any of the detected features, a detected edge, a detected product, a detected alphanumeric character, a color of the alphanumeric character, a size of the alphanumeric character, a font of the alphanumeric character, and a background color.

In some embodiments, the program code is further executable by said at least one hardware processor to extract the contextual data by using an algorithm selected from the group consisting of: an optical character recognition (OCR) algorithm, a product recognition algorithm, an edge detection algorithm, a depth detection algorithm, and a contour detection algorithm.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A method, a system and a computer program product are disclosed herein to apply machine learning to train a computer-vision based price tag detector. The price-tag detection may include two stages: a gross feature detection stage that detects any price tags included within an image together with numerous false detections, and a classification stage that filters out the false detections to discern the true price tags. The gross feature detection may be implemented by a feature detector, trained using supervised machine learning to have a high probability of detecting all the price tags in any given image. The classification stage may be implemented by a classifier trained using a two-phase, hybrid machine learning technique that includes both a supervised learning phase and an unsupervised learning phase that applies contextual data extracted from the image to discern the price tags from the false positive detections.

Figure 1A:
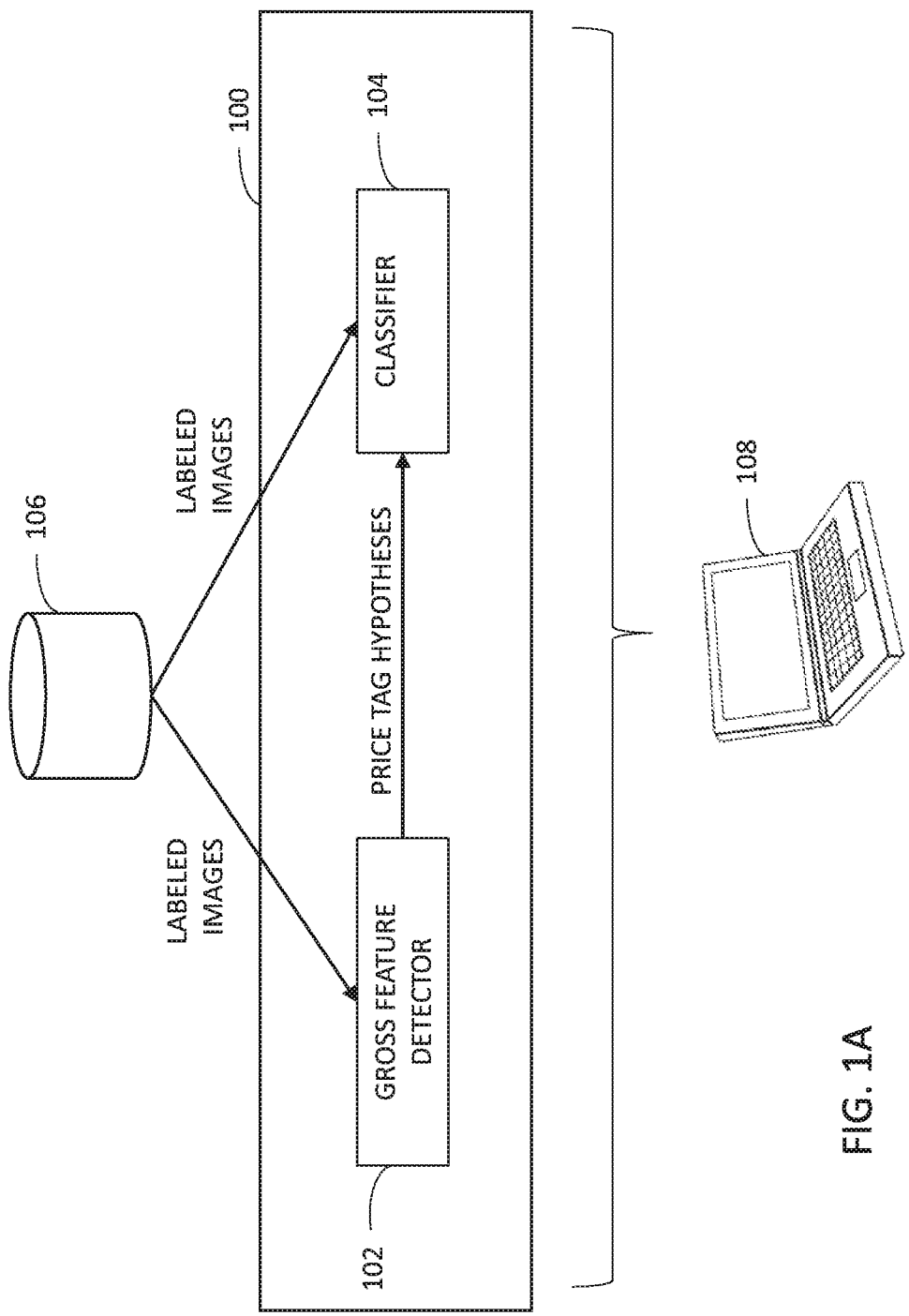
FIG. 1A illustrates a conceptual data flow diagram for a supervised learning phase of a price tag detector, in accordance with an embodiment.

Reference is now made to FIG. 1A which illustrates a conceptual data flow diagram for the supervised learning phase of a price tag detector 100, in accordance with an embodiment. Price tag detector 100 may include a gross feature detector 102 and a feature classifier 104 each of which are initially trained in a supervised learning phase using a relatively small set of labeled images stored at a storage device 106. For example, a label may be defined as a set of coordinates specifying the location of a price tag in the labeled image. Price tag detection, in this context, may comprise detecting the location of a price tag in a new, unlabeled image.

The labeled images may include multiple images of different types of price tags stored with metadata 'labels' that define the respective class of each price tag, and that comprise the output of the mapping function derived from the learning process. The labeled images may be received by each of gross feature detector 102 and classifier 104 configured with a computing device 108, provided to train detector 100. Gross feature detector 102 may be trained using known machine learning techniques to detect a set of price tag hypotheses that includes at least any price tags included within the labeled images. However, to ensure that gross detector 102 detects all the price tags in an image, the detection results may be noisy, and additional non-price tag features may be detected as 'false positive' detections. Such false positive detections may include features having similar attributes to the price tags, and/or feature detections resulting from artifacts, glare, reflection, distortion, and the like.

Optionally, the gross feature detector 102 may implement a Viola Jones cascade algorithm having a high probability of detecting all the price tags, with the downside of detecting multiple false positive features, and thus subsequent fine-tuning may be required to distinguish the price tags from the false positive detections. Gross feature detector 102 may be sensitive to the aspect ratio of any of the detected features. To address this, the supervised training set may include different types of labeled price tags, having various aspect ratios and/or formats, such as fonts, text size, text color, background color, and the like. Optionally, the gross feature detector 102 may be an aggregation of multiple specific feature detection algorithms, each trained on a different supervised set of price tags conforming to a specific format and/or aspect ratio. The supervised set of labeled images may include a relatively small number of diverse price tag samples. For example, as few as three to five labeled images, optionally including multiple price tags per images, may be sufficient for the supervised training.

The price tag hypotheses may be provided to classifier 104 which classifies each hypothesis as either being a price tag or not. The labeled images may be provided to classifier 104 to verify and/or refine the classification, comprising the supervised learning phase for classifier 104, and resulting in a semi-trained classifier 104.

Thus, the supervised training phase for classifier 104 may use the same supervised set of labeled images used to train gross feature detector 102. In one implementation, the classifier may employ a support vector machine (SVM) configured to process features represented as Fisher vectors. Each example, or feature of the supervised set may be transformed to a Fisher vector, and the resultant Fisher vector provided to train the SVM. To implement the transformation, each of the supervised examples may be resized to a canonical size. For each resized training example, local descriptors of the resized training example may be calculated on a sparse grid, such as a dense scale-invariant feature transform (SIFT), to yield multiple descriptor vectors. These descriptor vectors may be concatenated to form a single vector representation for each training example. A Gaussian mixture model (GMM) may be trained on each descriptor vector element for each of the concatenated vectors, and the Fisher vector may be produced from the trained GMMs. Training the SVM on the Fisher vectors produced from the supervised training examples may yield a partially trained classifier.

Figure 1B:
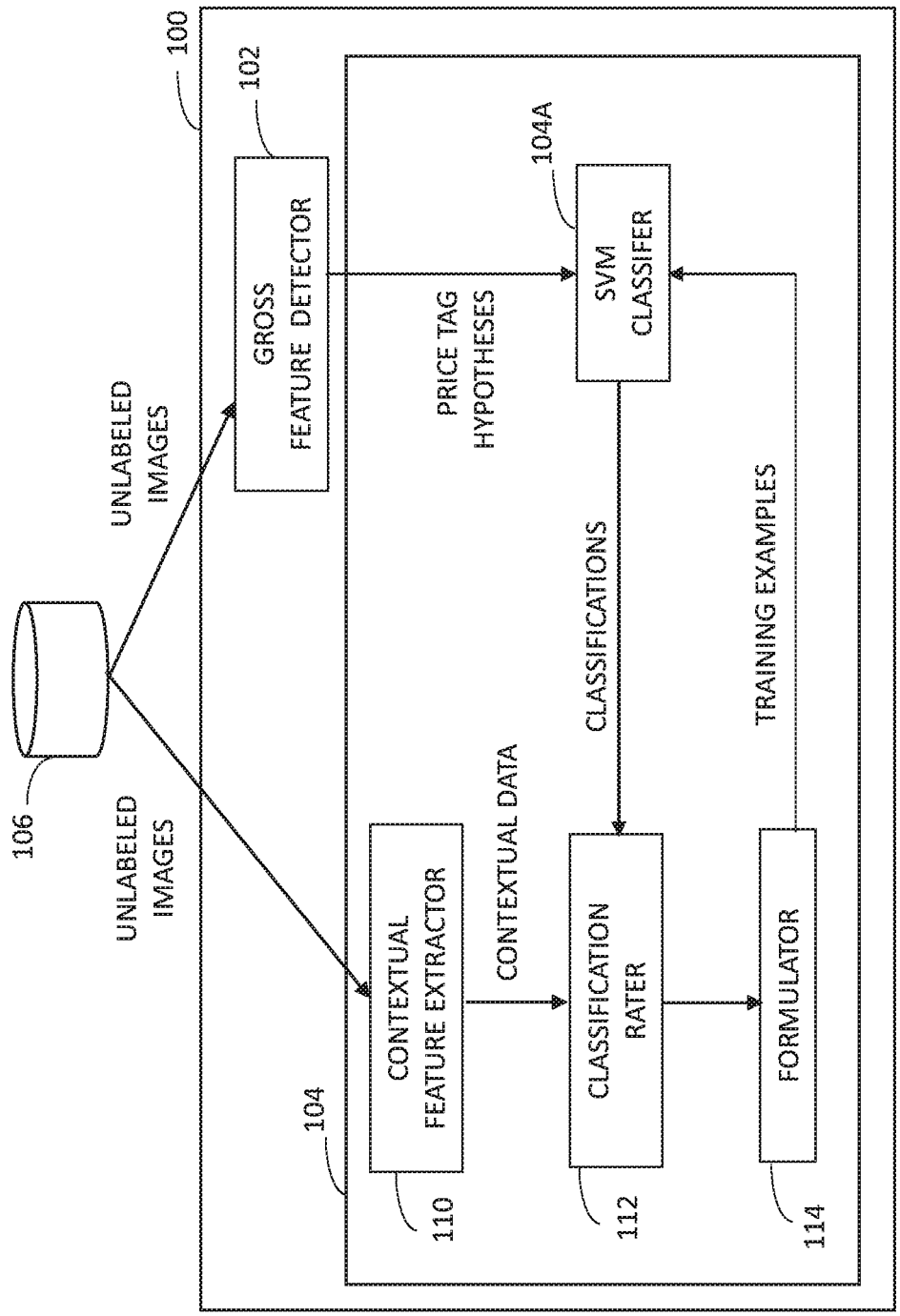
FIG. 1B illustrates a conceptual data flow diagram for training the semi-trained classifier of FIG. 1A in an unsupervised training phase, in accordance with an embodiment FIGS. 2A-2D, taken together, illustrate an exemplary implementation of the unsupervised training phase for the semi-trained classifier of FIG. 1A, in accordance with an embodiment.

Reference is now made to FIG. 1B which illustrates a conceptual data flow diagram for training the semi-trained classifier 104 of detector 100 in the unsupervised training phase of the hybrid machine learning technique, using a set of unlabeled images stored at storage device 106, in accordance with an embodiment. Optionally, the set of unlabeled images is considerably larger than the set of labeled images used for the supervised training. For example, a set of approximately fifty price tags, distributed over ten images, i.e. an average of five price tags per image, may be used for the unsupervised learning phase. It may be appreciated that one or more of the unlabeled images for the unsupervised learning phase may include no price tags. It may further be appreciated that the number of unlabeled images used for the unsupervised phase may exceed ten images. For example, the system may be trained using hundreds of unlabeled images.

The unlabeled images may be provided to gross feature detector 102 trained as described above, to detect a set of price tag hypotheses for each unlabeled image. The price tag hypotheses may include at least any price tags included in the unlabeled images, in addition to one or more false positive detections, and may be provided to semi-trained classifier 104 for classification. Classifier 104 may include an SVM classifier 104a, a contextual feature extractor 110, a classification rater 112, and a formulator 114, details of which are provided below.

Each of the price tag hypotheses detected by trained feature detector 102 may undergo pre-processing similar to that described above for the supervised training examples to transform them to Fisher vectors, which may then be provided to the partially trained classifier 104 for classification. Each feature hypothesis, comprising a cropped portion of one of the unlabeled images, may be resized to a canonical size. Local descriptors of each resized feature may be calculated on a sparse grid, such as a dense scale-invariant feature transform (SIFT), to yield multiple descriptor vectors. These descriptor vectors may be concatenated to a single vector. A Gaussian mixture model (GMM) may be trained on each descriptor vector element for each of the concatenated vectors, and the Fisher vector may be produced from the trained GMMs. The SVM classifier 104a may analyze each of these Fisher vectors, corresponding to each detected feature of each unlabeled image, and may classify the feature as either a price tag or a false positive detection.

Additionally, the unlabeled images may be provided to a contextual feature extractor 110 which extracts contextual data from each unlabeled image, such as, but not limited to any combination of: optical character recognition (OCR), line and edge recognition, depth and/or flatness detection, and product recognition. The contextual data extracted by extractor 110 and the classifications produced by SVM classifier 104a are provided to a classification rater 112 which rates each classification based on the extracted contextual data, and assigns each classification a confidence score.

The confidence score may be based on contextual properties and/or attributes extracted from the unlabeled images, such as but not limited to: color, texture, depth, flatness, the relative position of each classified feature with respect to additional features detected in the image, the presence of alphanumeric characters in the detected feature and/or additional identifying graphics, a color attribute of the background and any detected characters. Any suitable image processing algorithm may be applied to extract these and other contextual properties, such as but not limited to: optical character recognition (OCR), product recognition, edge detection, depth/contour detection, and the like may be applied to determine the contextual-based confidence level together with one or more contextual rules. The rules may produce binary results, or alternatively may assign a value within a range, such as a likeliness value.

For example, a feature classified as a price tag may be assigned a high confidence score if: a) it is positioned at the edge of a shelf below a set of products, b) it is not positioned on or above a product, and c) it includes one or more dark (black) characters of a predefined font and/or size displayed against a flat, light colored, or white background. Additional contextual rules may be applied as necessary.

Thus assigned, the confidence scores may be used to define a set of contextual examples from the detected features. For example, features with high confidence scores may be defined as positive examples, and features with low confidence scores may be defined as negative examples. Optionally, the confidence scores are binary, with 0 being a low confidence score, and 1 being a high confidence score. Alternatively, the confidence scores may be represented by a distribution, such as Gaussian distribution, where a confidence score greater than one standard deviation on the upside may be defined as a high confidence score, and a confidence score less than one standard deviation on the downside may be defined as a high confidence score.

Thus rated, the classifications with their respective confidence scores are formulated as a new set of training examples by formulating module 114, and provided as feedback to SVM classifier 104a for reclassification. For example, formulating module 114 may transform the training examples to Fisher vectors as described above. Classifier 104a reclassifies the price tag hypotheses based on the training examples formulated with their confidence scores, and the new classification are rated again in an iterative process, to fine-tune the classification and improve the accuracy of discerning between the true price tags and the false positive detections. By using contextual data to train the classifier, the classifier may be taught to learn relevant contextual rules for classifying images obtained on-the-fly with greater accuracy, requiring only a relatively small set of labeled training examples.

Figure 2A:
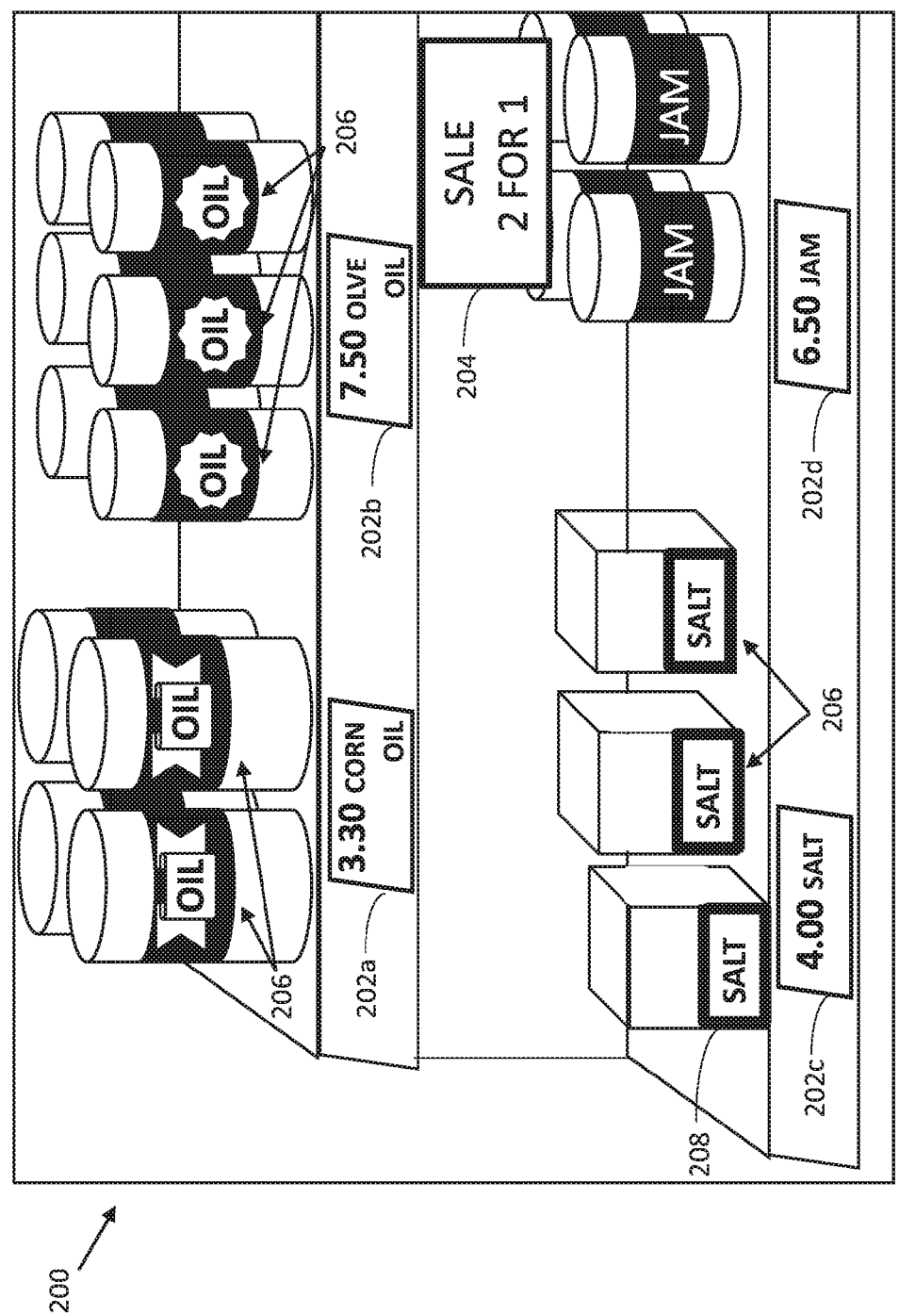

Reference is now made to FIGS. 2A-2D which together illustrate an exemplary implementation of the unsupervised training phase for semi-trained classifier 104, in accordance with an embodiment. Referring to FIG. 2A, detector 100 receives an unlabeled image 200, such as a retail image of a store shelf carrying multiple products with one or more price tags 202a-d affixed to the edge of the shelves beneath the products, and indicating product attributes such as the net price and/or price per weight, product code, and the like. Additional visual features may be captured in the image, such as a promotional sign 204 and/or labels 206 and 208 disposed on the products, and that may complicate the task of discerning the price tags from these additional, non-interest features captured in the image.

Figure 2B:
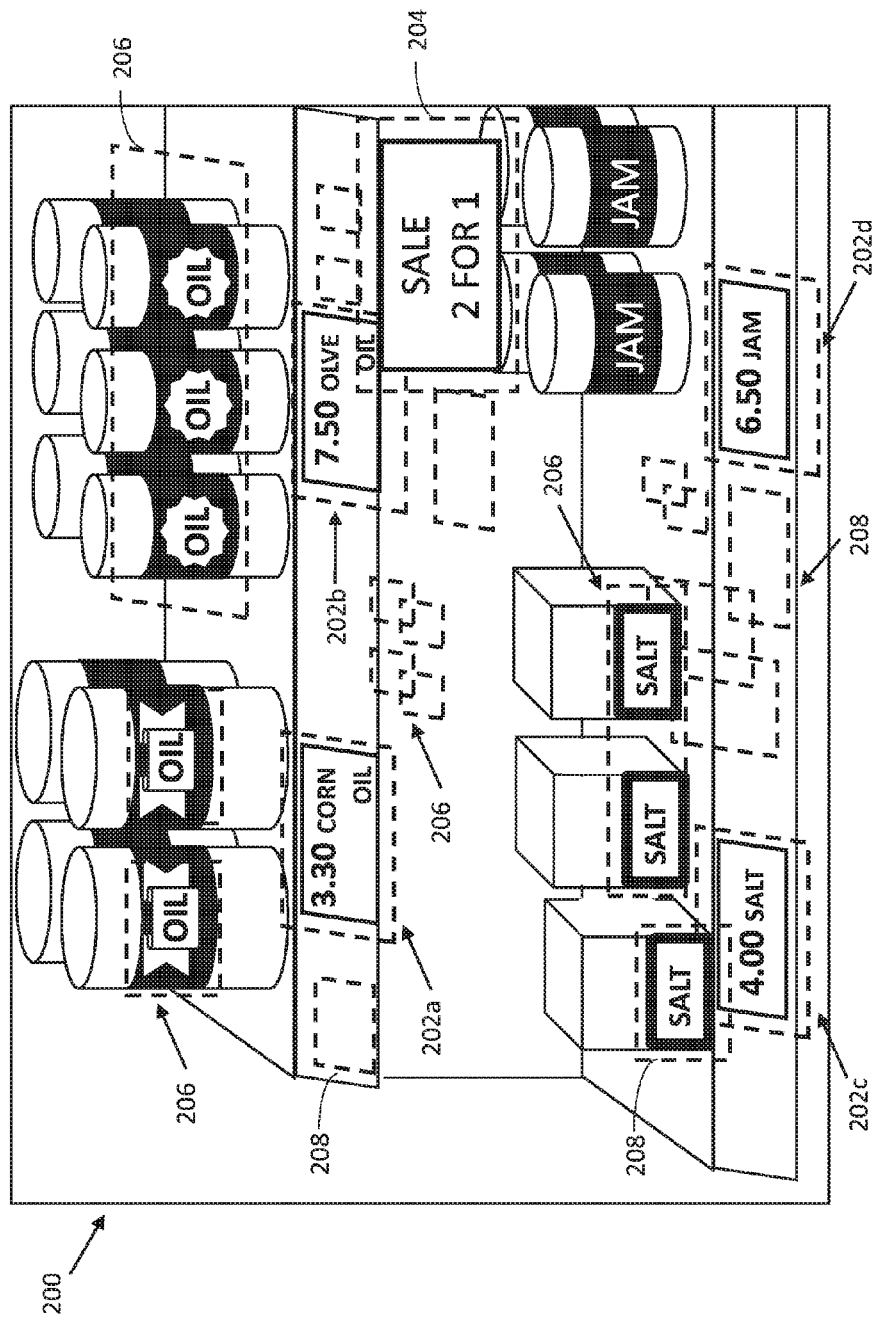

Referring to FIG. 2B, image 200 is analyzed by gross feature detector 102 which detects multiple price tag hypotheses, shown as dashed boxes, including at least price tags 202a-d as well as additional, non-price tag 'false positive' detections, such as price tag hypotheses 204, 206 and 208.

The price tag hypotheses 202a-d, 204, 206 and 208 are classified by SVM classifier 104a as either price tags, or not. Image 200 is analyzed by feature extractor 110 which extracts contextual data associated with image 200 and the price tag hypotheses, as described above. The hypotheses are rated by rater 112 and provided as feedback to SVM classifier 104a which fine-tunes the classifications, accordingly.

Figure 2C:
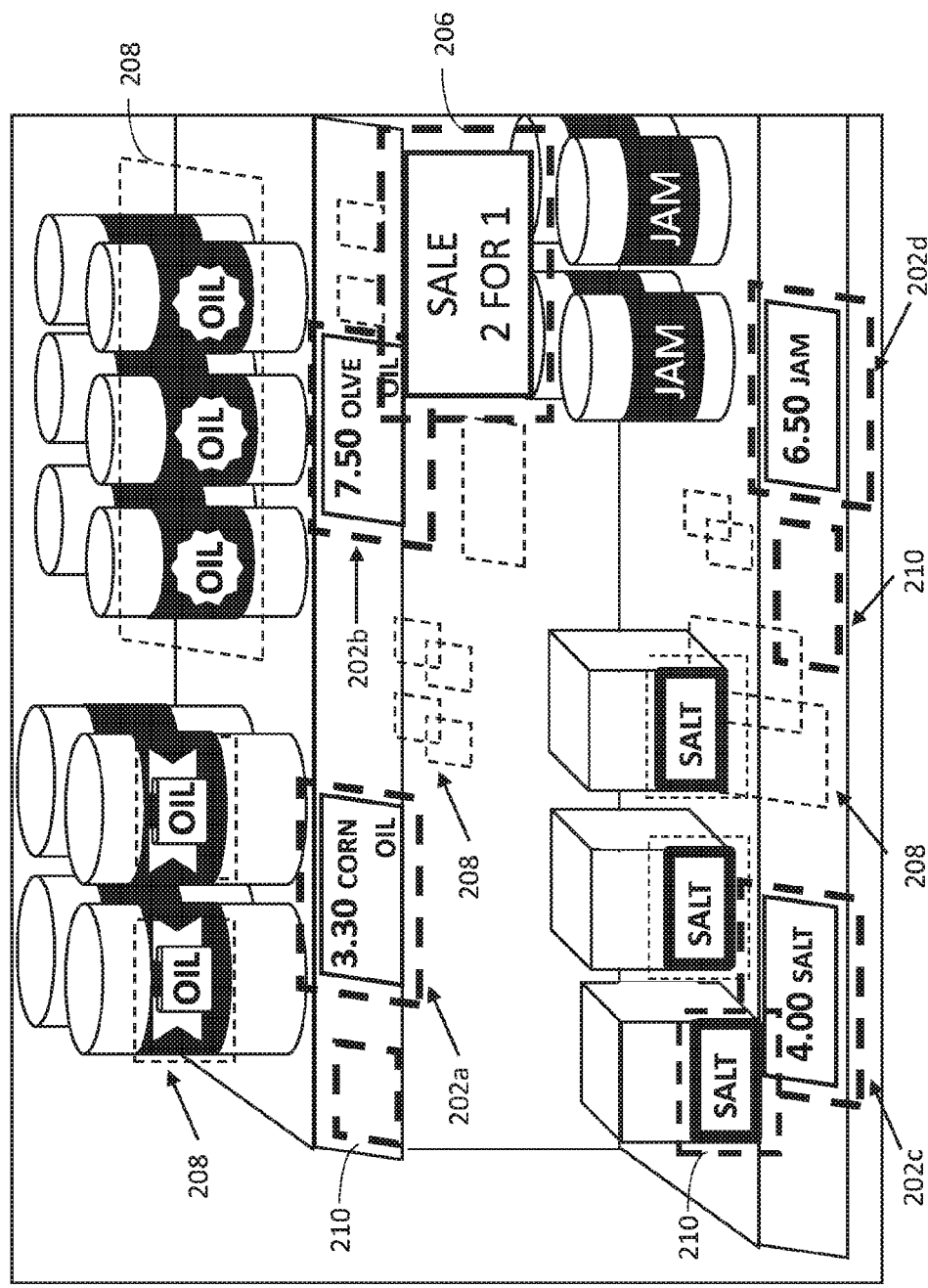

Referring to FIG. 2C, the results of the first pass of the classification are shown. Hypotheses having a high confidence score are indicated by the thicker dashed lines and may be defined as positive examples for a subsequent training phase. The hypotheses having a low confidence score are indicated by the finer dashed lines and may be defined as negative examples for the subsequent training phase. As can been seen, in the first pass, the contextual rules correctly assigned high confidence level to price tags 202a-d. However, although the false positive hypotheses 208 of FIG. 2B were correctly ruled and assigned a low confidence level based on the contextual data indicating they are not price tags, such as by determining that they are positioned on products and/or not on the edge of a shelf, and/or do not include characters, other false positive hypotheses, namely features 206 and 210 were incorrectly assigned a high confidence level. For example, the 'SALE' sign 206 having black characters displayed on a flat white background and positioned below the edge of the shelf was incorrectly assigned a false positive 'high' confidence score for the first pass of the classifier algorithm. Similarly, the 'SALT' label 210 disposed on a flat surface flush with the edge of the shelf was incorrectly assigned a false positive 'high' confidence score. Other features 210 appearing on the edge of the shelf, such as artifacts due to glares or reflections, were incorrectly assigned a false positive 'high' confidence score as well.

The contextual examples defined above with their respective confidence scores may be used as feedback to retrain SVM classifier 104a. Thus, the correctly scored positive examples 204a-d, as well as the incorrectly scored positive examples 206 and 210, and correctly scored negative examples 208 are used to retrain the SVM classifier 104a. Retrained SVM classifier 104a may reclassify hypotheses 204a-d and 206 and 210 and the confidence levels for the remaining detected features may be recalculated. This process may repeat iteratively until there is a convergence.

Figure 2D:
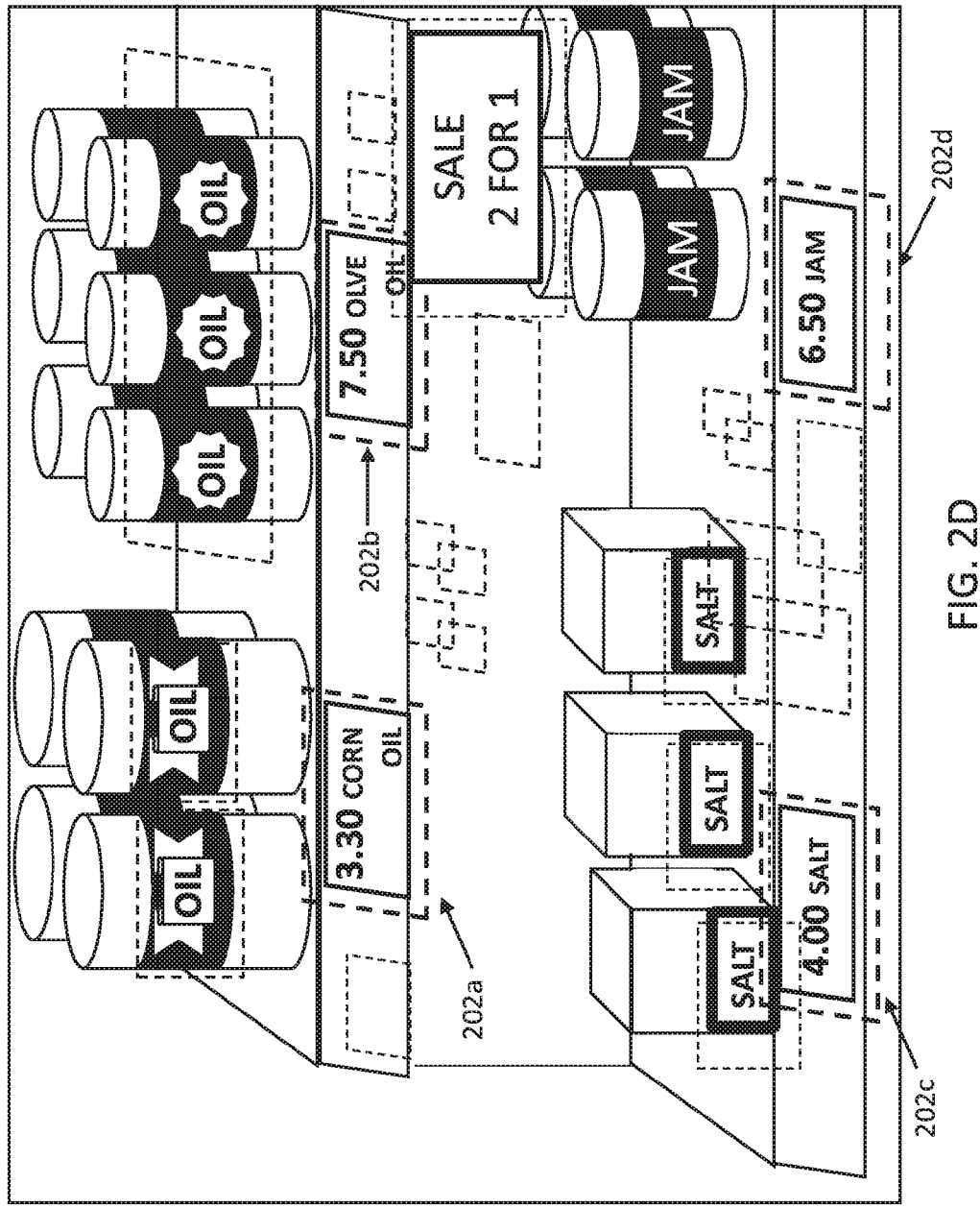

Referring to FIG. 2D, in the second pass, SVM classifier 104a retrained using the non-supervised contextual examples defined above, correctly classified only price tags 202a-d as price tags, correcting the previous incorrect scores and filtering out the false-positive detections. This method may be repeated for numerous images under varying lighting conditions, perspectives, scenarios and the like to provide a robust set of contextual data to augment the detection of price tags. Thus trained, the automatic price tag detector may be used to detect price tags from images captured in different contexts 'on the fly'.

Optionally, the price tag detector may undergo a customized training for different settings. For example, the contextual data, such as price tag formats, and lighting for a retail setting, such as a supermarket, may be different than for a wholesale setting, such as a warehouse. Thus, the automatic price tag detector may be trained according to its expected application.

Figure 3:
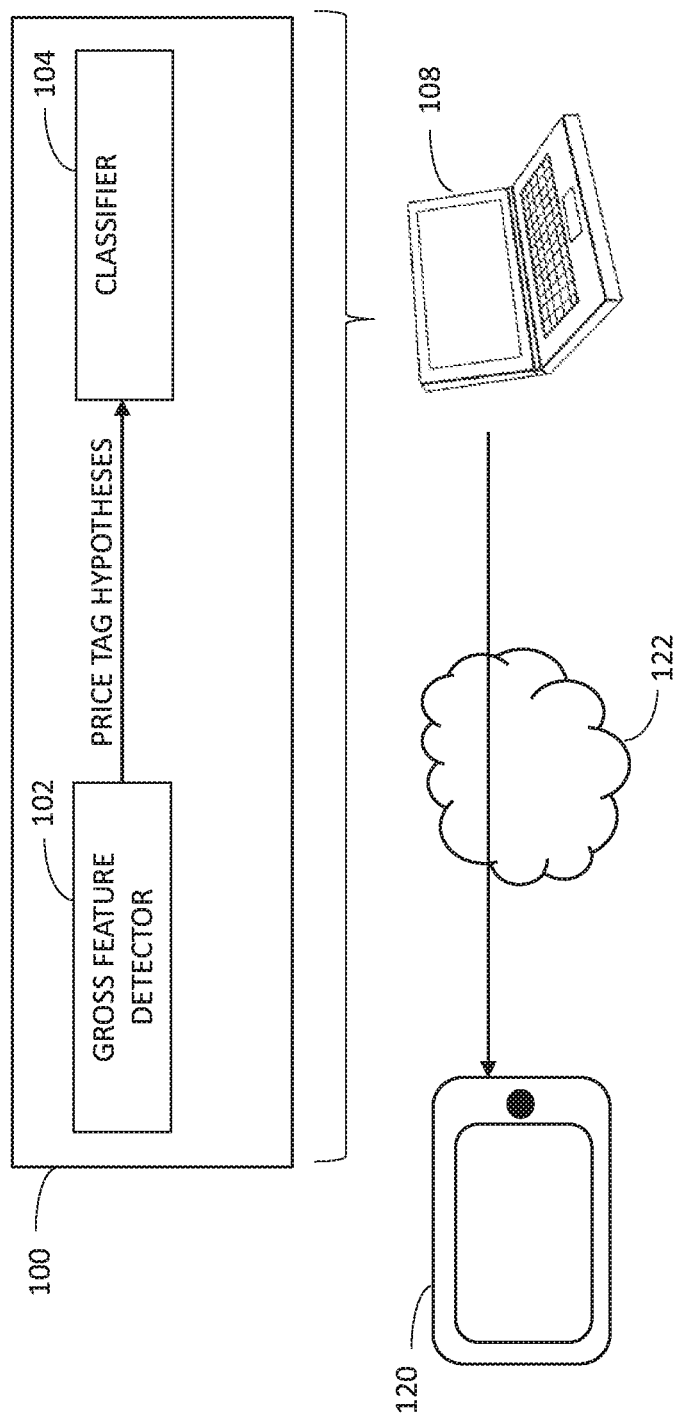
FIG. 3 illustrates a system for detecting a price tag using the price tag detector trained using the hybrid training technique described with respect to FIGS. 1A-1B, in accordance with an embodiment

Reference is now made to FIG. 3 which illustrates a system for detecting a price tag using price tag detector 100 trained using the hybrid training technique described above, in accordance with an embodiment. A camera integrated with a computing device 120, is provided to capture one or more image of a scene including one or more price tags. For example, the image may be a retail image similar to image 200 above, including one or more price tags as well as additional non-price tag features, such as labels, signs, and the like.

Device 120 may communicate the captured image to computing device 108 configured with trained price tag detector 100 via a network 122 using any known communications means, such as but not limited to infrared wireless, WiFi, Bluetooth, satellite communication, broadcast radio, Microwave radio, Zigbee and the like. Alternatively, one or more modules of trained price tag detector 100 may be configured with device 120, allowing the detection of the price tags to be performed locally at computing device 110, or using any distributed combination of devices 120 and 108.

Price tag detection by detector 100 includes two stages: the gross feature detection stage implemented by gross feature detector 102, and the feature classification stage implemented by classifier 104, both trained as described above. In the first stage, gross feature detector 102 analyzes the image and detects multiple features comprising a set of price tag hypotheses. The price tag hypotheses are then evaluated by the trained classifier 104 which classifies each hypothesis as either a price tag or not, based on contextual data extracted from the image and the respective rules learned during the unsupervised training process. The results of the classification may be rendered onto a display of device 122 or alternatively may be used for other suitable purposes. For example, the detected price tags may be registered with a product database and used either for updating the database, providing alerts, and the like.

Figure 4A:
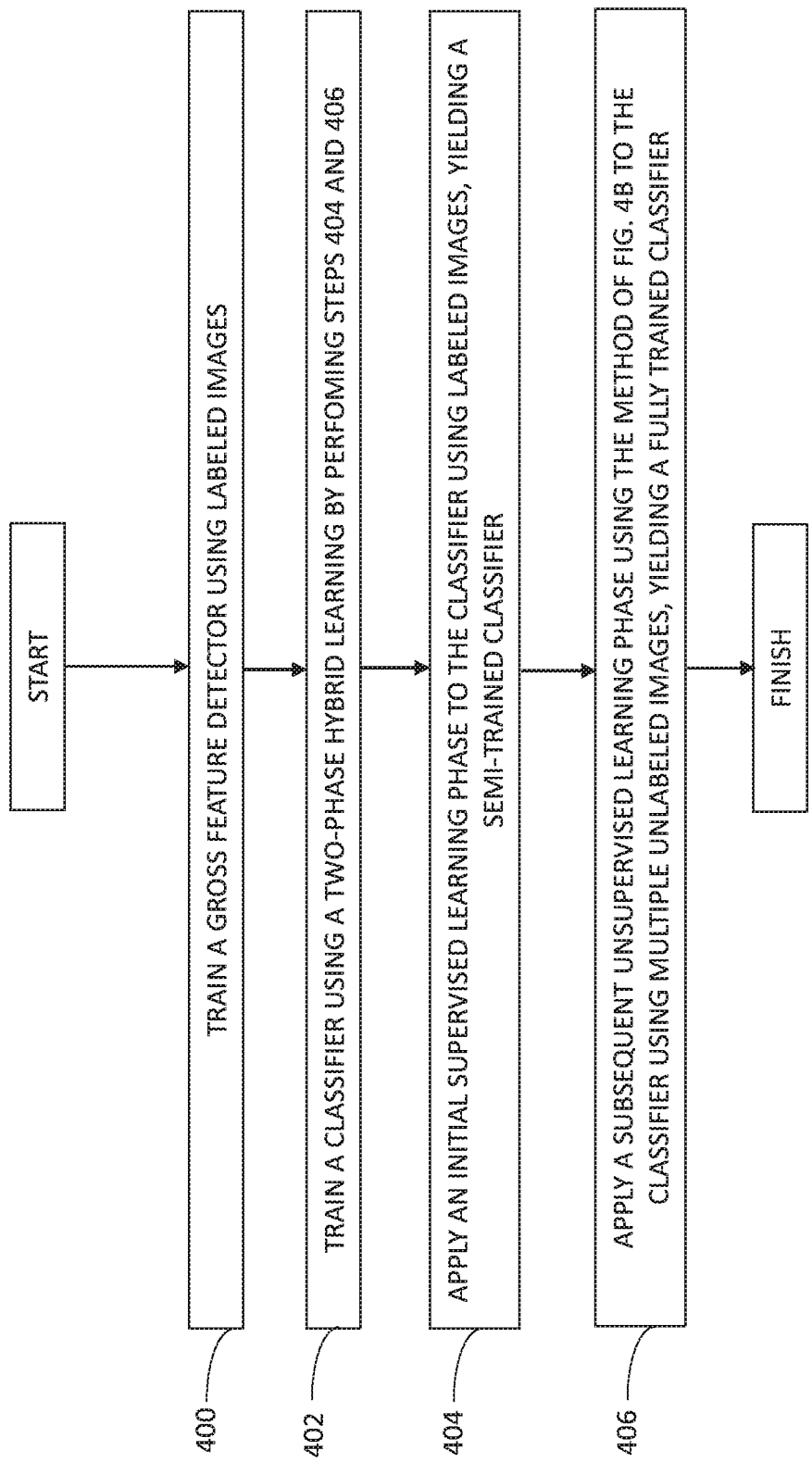
FIG. 4A illustrates a high-level flowchart of a method to train the price tag detector of the system of FIGS. 1A-1B, in accordance with an embodiment.

Reference is now made to FIG. 4A, which illustrates a high-level flowchart of a method to train the price tag detector of the system of FIGS. 1A-1B. A gross feature detector may be trained using a supervised learning process with a set of labeled images (Step 400). Optionally, the gross feature detector comprises a Viola Jones Cascade algorithm. Optionally, the set of labeled images include multiple categories of aspect ratios and price tag formats, and the gross feature detector is an aggregation of multiple feature detection algorithms, each trained on a different one of the categories.

A classifier may be trained using a two-phase hybrid learning process (Step 402). An initial supervised learning phase may be applied to the classifier using the set of labeled images, and yielding a semi-trained version of the classifier (Step 404). A subsequent unsupervised learning phase, described in the flowchart of FIG. 4B, may be applied to the classifier using a set of unlabeled images, and yielding a fully trained version of the classifier (Step 406).

Figure 4B:
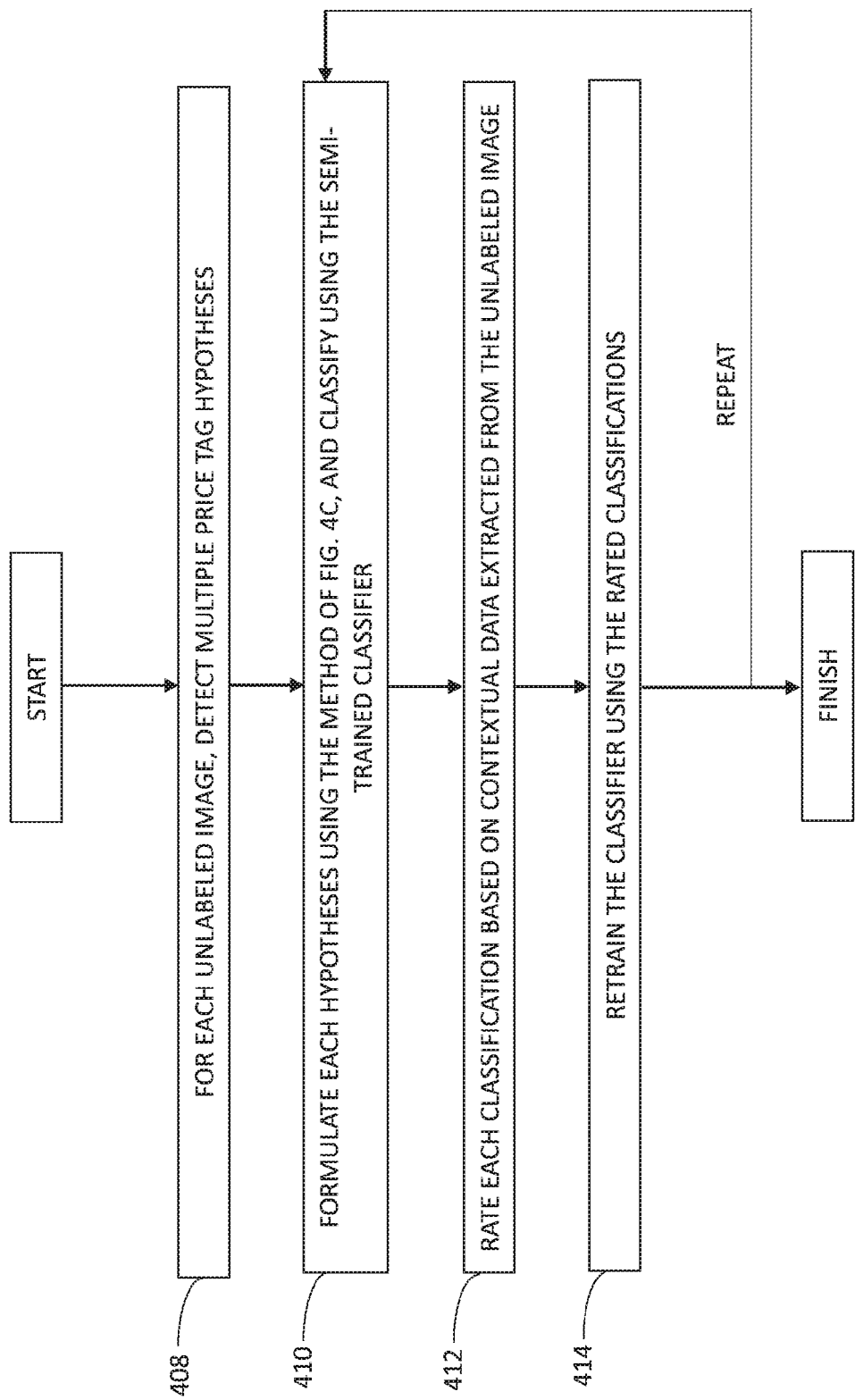
FIG. 4B illustrates a flowchart of a method for implementing the unsupervised learning phase for the classifier of the system of FIGS. 1A-1B, in accordance with an embodiment.

Reference is now made to FIG. 4B, which illustrates a flowchart of a method for implementing the unsupervised learning phase for the classifier of the system of FIG. 1A, in accordance with an embodiment. For each acquired unlabeled image: multiple price tag hypotheses may be detected using the gross feature detector (Step 408). Each price tag hypothesis may be formulated using the method of FIG. 4C, and classified as either a price tag or a false positive detection using the semi-trained classifier, trained during the initial supervised learning phase (Step 410). Each classification may be rated based contextual data extracted from the unlabeled image (Step 412). The semi-trained classifier may be retrained with the rated classifications (Step 414). Steps 410 through 414 may be repeated until the reclassification converges, yielding the fully trained classifier.

The contextual data may include any of: a color attribute, a texture attribute, a depth attribute, a flatness attribute, a relative position, the detection of any of an edge, a product, and an alphanumeric character, a color of the alphanumeric character, a size of the alphanumeric character, a font of the alphanumeric character, and a background color, however this list is not meant to be limiting. The contextual data may be extracted using any of: an optical character recognition (OCR) algorithm, a product recognition algorithm, an edge detection algorithm, a depth detection algorithm, and a contour detection algorithm, to name a few.

Figure 4C:
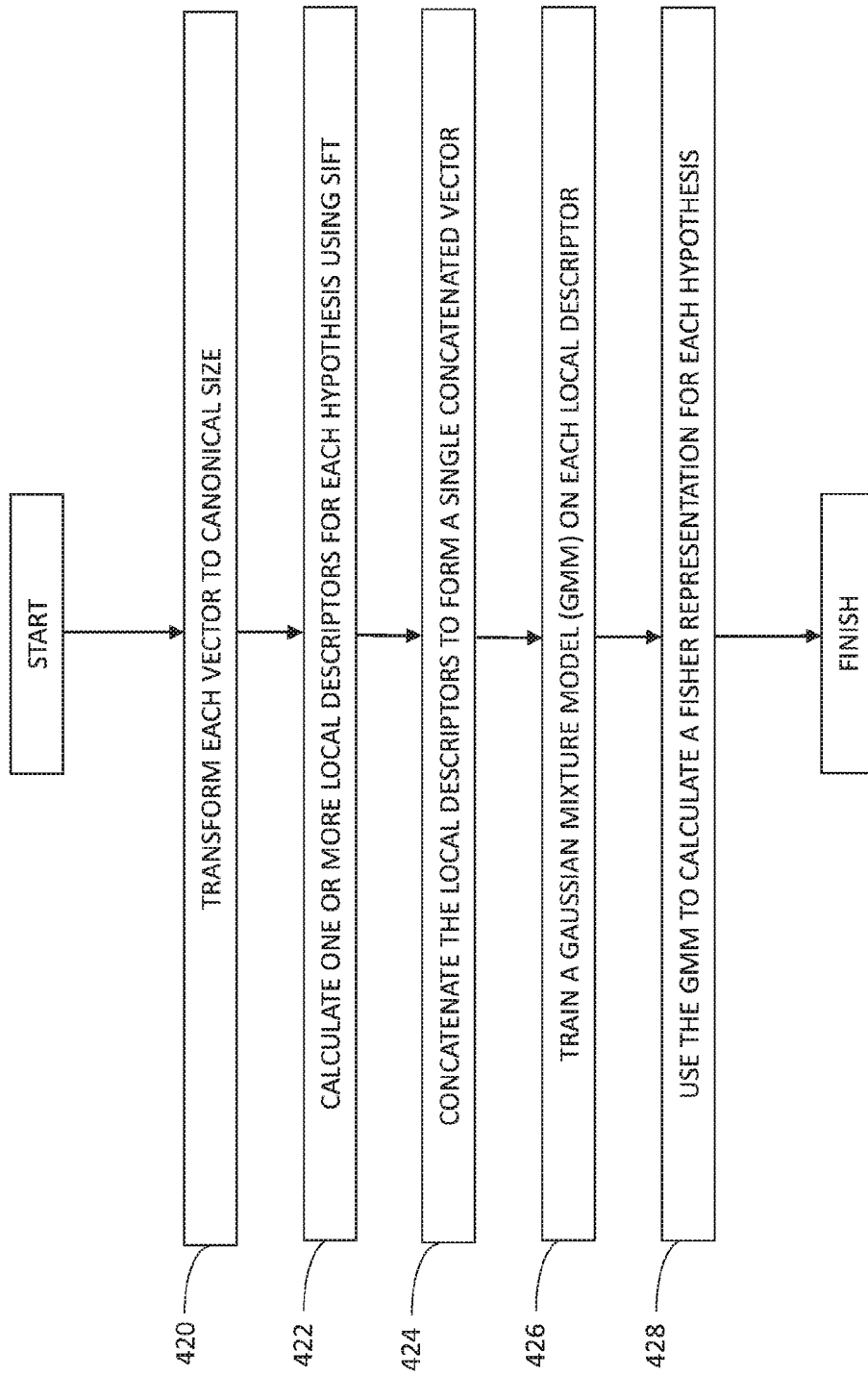
FIG. 4C illustrates a flowchart of a method for formulating price tag hypotheses as Fisher vectors is shown, in accordance with an embodiment.

Referring to FIG. 4C, a flowchart of a method for formulating price tag hypotheses as Fisher vectors is shown, in accordance with an embodiment. The classifier may be a support vector machine (SVM) that classifies the price tag hypotheses formulated in a Fisher vector representation. Thus, each detected feature may be represented as a Fisher vector by: transforming each detected feature to a canonical size (Step 420); calculating one or more local descriptors using a dense scale-invariant feature transform (SIFT) (Step 422); concatenating the one or more local descriptors to form a single concatenated vector (Step 424); training a Gaussian mixture model (GMM) for each local descriptor (Step 426); and using the GMMs to calculate a Fisher representation for the concatenated vector (Step 428).

Thus trained, the classifier may be used to automatically detect one or more price tags in an unlabeled image.

Figure 5:
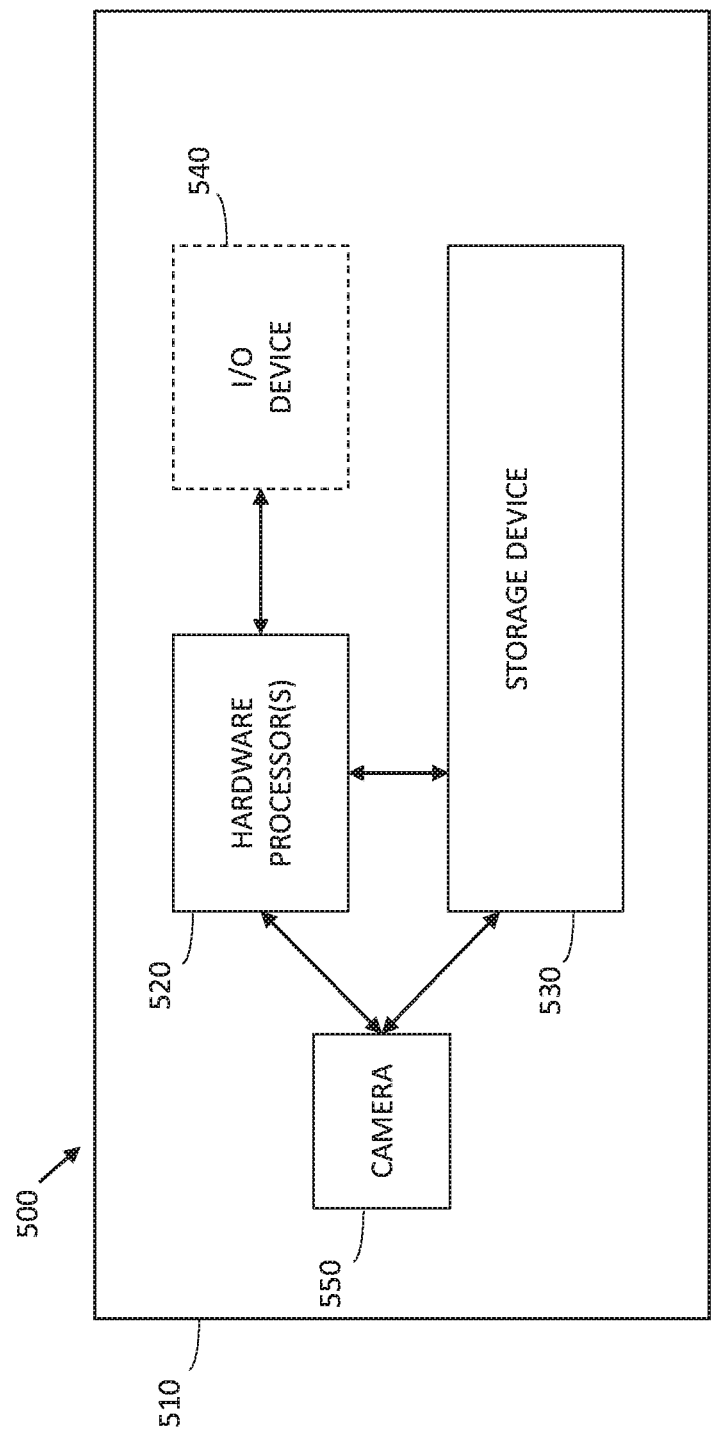
FIG. 5 shows an exemplary system according to an embodiment.

Reference is now made to FIG. 5, which shows an exemplary system 500, according to an embodiment. System 500 may include a computing device 510. Computing device 510 may include a hardware processor 520, a storage device 530, an optional input/output ("I/O") device 540, and optionally a digital camera 550. Hardware processor 520 may include one or more hardware processors, storage device 530 may include one or more storage devices and I/O device 540 may include one or more I/O devices, camera 550 may include one or more optical components. Hardware processor 520 may be configured to execute any of the steps of described above. I/O device 540 may be configured to provide and/or receive a data stream, and allow a user to interact with system 500. Dedicated software, implementing the methods discussed above, may be stored on storage device 530 and executed by hardware processor 520.

In some embodiments, computing device 510 may include an I/O device 540 such as a terminal, a display, a keyboard, a mouse, a touch screen, a microphone, an input device and/or the like, to interact with system 500, to invoke system 500 and to receive results. It will however be appreciated that system 500 may operate without human operation and without I/O device 540.

In some exemplary embodiments of the disclosed subject matter, storage device 530 may include and/or be loaded with code for a user interface. The user interface may be utilized to receive input and/or provide output to and from system 500, for example receiving specific user commands and/or parameters related to system 500, providing output, or the like.

In some embodiments, camera 550 may be controllable and/or operable by hardware processor 520. Images captured by camera 550 may be stored at storage device 530 and accessible to processor 520 for processing and/or display at I/O 540.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method comprising using at least one hardware processor for:
   training a price tag detector that comprises a gross feature detector and a classifier, to automatically detect a price tag in an image, by:
   a) training the gross feature detector using a supervised learning process with a set of labeled images, and
   b) training the classifier using a two-phase hybrid learning process comprising:
      applying an initial supervised learning phase using the set of labeled images, yielding a semi-trained version of the classifier, and
      applying a subsequent unsupervised learning phase using a set of unlabeled images, yielding a fully trained version of the classifier,
      wherein the applying of the unsupervised learning phase comprises, for each unlabeled image:
      i) detecting multiple price tag hypotheses using the gross feature detector,
      ii) classifying each price tag hypothesis using the semi-trained classifier,
      iii) rating each classification based contextual data extracted from the unlabeled image,
      iv) retraining the semi-trained classifier with the rated classifications, and
      repeating steps ii) through iv) until the reclassification converges thereby yielding the trained classifier.

2. The method of claim 1, wherein the gross feature detector comprises a Viola Jones Cascade algorithm, and wherein the labeled images comprise multiple categories of aspect ratios and price tag formats, wherein the gross feature detector comprises an aggregation of multiple feature detection algorithms, each trained on a different one of the categories.

3. The method of claim 1, wherein the classifier is a support vector machine (SVM), wherein the price tag hypotheses comprise any of a price tag detection and a false positive detection, and wherein each price tag hypothesis is formulated as a Fisher vector by:
   transforming each price tag hypothesis to a canonical size,
   calculating one or more local descriptors for each price tag hypothesis using a dense scale-invariant feature transform (SIFT),
   concatenating the one or more local descriptors to form a single concatenated vector,
   training a Gaussian mixture model (GMM) for each local descriptor, and
   using the GMMs to calculate a Fisher representation for the concatenated vector,
   wherein classifying each price tag hypothesis using the semi-trained classifier comprises classifying the Fisher vectors using the SVM.

4. The method of claim 1, wherein the contextual data is selected from the group consisting of: a color attribute, a texture attribute, a depth attribute, a flatness attribute, a relative position of any of the detected features, a detected edge, a detected product, a detected alphanumeric character, a color of the alphanumeric character, a size of the alphanumeric character, a font of the alphanumeric character, and a background color.

5. The method of claim 4, further comprising using the at least one hardware processor for extracting the contextual data by using an algorithm selected from the group consisting of: an optical character recognition (OCR) algorithm, a product recognition algorithm, an edge detection algorithm, a depth detection algorithm, and a contour detection algorithm.

6. The method of claim 1, further comprising: capturing an image, and using the at least one hardware processor for detecting a price tag in the captured image using the price tag detector.

7. A computer program product comprising a non-transitory computer-readable storage medium having program code embodied thereon, the program code executable by at least one hardware processor to:
   train a price tag detector that comprises a gross feature detector and a classifier, to automatically detect a price tag in an image, by:
   a) training the gross feature detector using a supervised learning process with a set of labeled images, and
   b) training the classifier using a two-phase hybrid learning process comprising:
      applying an initial supervised learning phase using the set of labeled images, and yielding a semi-trained version of the classifier, and
      applying a subsequent unsupervised learning phase using a set of unlabeled images, yielding a fully trained version of the classifier,
      wherein applying the unsupervised learning phase comprises:
      for each unlabeled image:
      i) detecting multiple price tag hypotheses using the gross feature detector,
      ii) classifying each price tag hypothesis using the semi-trained classifier,
      iii) rating each classification based contextual data extracted from the unlabeled image,
      iv) retraining the semi-trained classifier with the rated classifications, and
      repeating steps ii) through iv) until the reclassification converges thereby yielding the trained classifier.

8. The computer program product of claim 7, wherein the gross feature detector comprises a Viola Jones Cascade algorithm, and wherein the labeled images comprise multiple categories of aspect ratios and price tag formats, wherein the gross feature detector comprises an aggregation of multiple feature detection algorithms, each trained on a different one of the categories.

9. The computer program product of claim 7, wherein the price tag hypotheses comprise any of a price tag detection and a false positive detection, and wherein the the program code is further executable to:
   represent each price tag hypothesis as a Fisher vector by:
      transforming each price tag hypothesis to a canonical size,
      calculating one or more local descriptors for each price tag hypothesis using a dense scale-invariant feature transform (SIFT),
      concatenating the one or more local descriptors to form a single concatenated vector, training a Gaussian mixture model (GMM) for each local descriptor, and
      using the GMMs to calculate a Fisher representation for the concatenated vector,
   wherein classifying each price tag hypothesis using the semi-trained classifier comprises classifying the Fisher vectors using the SVM.

10. The computer program product of claim 7, wherein the contextual data is selected from the group consisting of: a color attribute, a texture attribute, a depth attribute, a flatness attribute, a relative position of any of the detected features, a detected edge, a detected product, a detected alphanumeric character, a color of the alphanumeric character, a size of the alphanumeric character, a font of the alphanumeric character, and a background color.

11. The computer program product of claim 10, wherein the contextual data is extracted by using an algorithm selected from the group consisting of: an optical character recognition (OCR) algorithm, a product recognition algorithm, an edge detection algorithm, a depth detection algorithm, and a contour detection algorithm.

12. A system, comprising:
at least one hardware processor; and
a non-transitory memory device having embodied thereon program code executable by said at least one hardware processor to:
  train a price tag detector that comprises a gross feature detector and a classifier, to automatically detect a price tag in an image, by:
  a) training the gross feature detector using a supervised learning process with a set of labeled images, and
  b) training the classifier using a two-phase hybrid learning process comprising:
    applying an initial supervised learning phase using the set of labeled images, and yielding a semi-trained version of the classifier, and
    applying a subsequent unsupervised learning phase using a set of unlabeled images, yielding a fully trained version of the classifier,
    wherein applying the unsupervised learning phase comprises:
    for each unlabeled image:
    i) detecting multiple price tag hypotheses using the gross feature detector,
    ii) classifying each price tag hypothesis using the semi-trained classifier,
    iii) rating each classification based contextual data extracted from the unlabeled image,
    iv) retraining the semi-trained classifier with the rated classifications, and
    repeating steps ii) through iv) until the reclassification converges thereby yielding the trained classifier.

13. The system of claim 12, further comprising a storage device configured to store the labeled images and the unlabeled images.

14. The system of claim 12, further comprising a camera configured to capture any of the labeled and unlabeled images.

15. The system of claim 13, further comprising a network, wherein the camera is integrated with a computing device configured to transmit any of the labeled and unlabeled images to the at least one hardware processor via the network.

16. The system of claim 12, wherein the feature detection algorithm is a Viola Jones Cascade algorithm.

17. The system of claim 12, wherein the set of labeled images comprise multiple categories of aspect ratios and price tag formats, wherein the feature detection algorithm comprises an aggregation of multiple feature detection algorithms, each trained on a different one of the categories.

18. The system of claim 12, wherein the price tag hypotheses comprise any of a price tag detection and a false positive detection, and wherein the program code is further executable by said at least one hardware processor to:
  represent each price tag hypothesis as a Fisher vector by:
    transforming each price tag hypothesis to a canonical size,
    calculating one or more local descriptors for each price tag hypothesis using a dense scale-invariant feature transform (SIFT),
    concatenating the one or more local descriptors to form a single concatenated vector, training a Gaussian mixture model (GMM) for each local descriptor, and
    using the GMMs to calculate a Fisher representation for the concatenated vector,
  wherein classifying each price tag hypothesis using the semi-trained classifier comprises classifying the Fisher vectors using the SVM.

19. The system of claim 12, wherein the contextual data is selected from the group consisting of: a color attribute, a texture attribute, a depth attribute, a flatness attribute, a relative position of any of the detected features, a detected edge, a detected product, a detected alphanumeric character, a color of the alphanumeric character, a size of the alphanumeric character, a font of the alphanumeric character, and a background color.

20. The system of claim 19, wherein the program code is further executable to by said at least one hardware processor to extract the contextual data by using an algorithm selected from the group consisting of: an optical character recognition (OCR) algorithm, a product recognition algorithm, an edge detection algorithm, a depth detection algorithm, and a contour detection algorithm.

* * * * *